United States Patent [19]

Shondel

[11] Patent Number: 5,303,627
[45] Date of Patent: Apr. 19, 1994

[54] SCROLL SAW

[76] Inventor: Albert L. Shondel, 1510 S. 20th, Centerville, Iowa 52544

[21] Appl. No.: 907,174

[22] Filed: Jul. 1, 1992

[51] Int. Cl.⁵ ............................................. B23D 51/00
[52] U.S. Cl. ...................................... 83/777; 83/783; 83/859
[58] Field of Search ................ 83/777, 779, 783, 784, 83/859, 662

[56] References Cited

U.S. PATENT DOCUMENTS

| 148,684 | 3/1874 | Ford | 83/783 |
| 157,775 | 12/1874 | Ale et al. | 83/784 |
| 1,590,488 | 6/1926 | Zopp | 83/777 |
| 4,455,909 | 6/1984 | Wilbs | 83/783 |

Primary Examiner—Hien H. Phan
Attorney, Agent, or Firm—Zarley, McKee, Thomte, Voorhees & Sease

[57] ABSTRACT

A scroll saw having an unlimited throat depth includes upper and lower spaced apart blade arms independently supported and interconnected only by a blade at their forward ends. A spring biases a forward end of the upper blade arm upwardly keeping the blade taut throughout its reciprocation by a motor connected through an eccentric to the lower blade arm. The lower saw unit may be movably positioned on a platform or cart while the upper saw unit is slidably supported on a wall mounted support arm.

11 Claims, 3 Drawing Sheets

SCROLL SAW

BACKGROUND OF THE INVENTION

A typical scroll saw is limited in the size of work piece it can cut. The saw will ordinarily have a support member which pivotally interconnects and supports the upper and lower blade arms. The blade arms will be interconnected at their forward ends by the blade and a spring will interconnect the rear ends. A motor connected through an eccentric arm to the lower blade arm will reciprocate the blade and pivot both blade arms against the action of the interconnecting spring normally biasing the blade arms apart at their rearward ends. Thus the work piece can be no longer than the distance between the blade and the frame portion connecting the upper blade arm to the lower saw unit. Many work pieces are larger than what this saw can accommodate.

Another shortcoming of the standard scroll saw is that when a blade breaks, the upper arm will continue to be reciprocated through the rear end spring connection thereby exposing the saw to possible damage.

Each time a blade is broken and a replacement blade is installed, time consuming adjustments are required before operation can be resumed.

Thus what is needed is a scroll saw that has no obstructions between the upper and lower arms to interfere with work piece regardless of size and a saw that will not damage itself when the blade is broken or require adjustments when a new blade is installed.

SUMMARY OF THE INVENTION

The conventional scroll saw can be modified in one of two ways to allow it to cut work pieces of any desired size. The support member pivotally interconnecting and supporting the upper and lower blade arms may be modified by cutting off the portion extending above the saw table. The upper blade arm would then be supported by a wall mounted support arm thereby spacing apart the upper and lower blade arms and independently supporting them with the only connection therebetween being the blade. The second approach is to substitute a cut off support member for the full size original frame member which would be for conventional scroll saw use if desired.

A normally expanded coil spring extends between a wall mounted support arm and the upper blade arm to bias the blade arm upwardly at its forward end to keep the blade taut. A cushioned stop is positioned in the pivotal path of the upper blade arm should the blade break thereby limiting the upward travel of the upper blade arm.

The lower saw unit may be mounted on a movable platform while the upper blade arm of the upper saw unit is slidably mounted on the wall support arm thereby allowing a work piece to be cut that has a length equal to the distance from the blade to the wall on which the upper blade arm is supported.

DESCRIPTION OF PREFERRED EMBODIMENT

Figures 1, 2, 3:
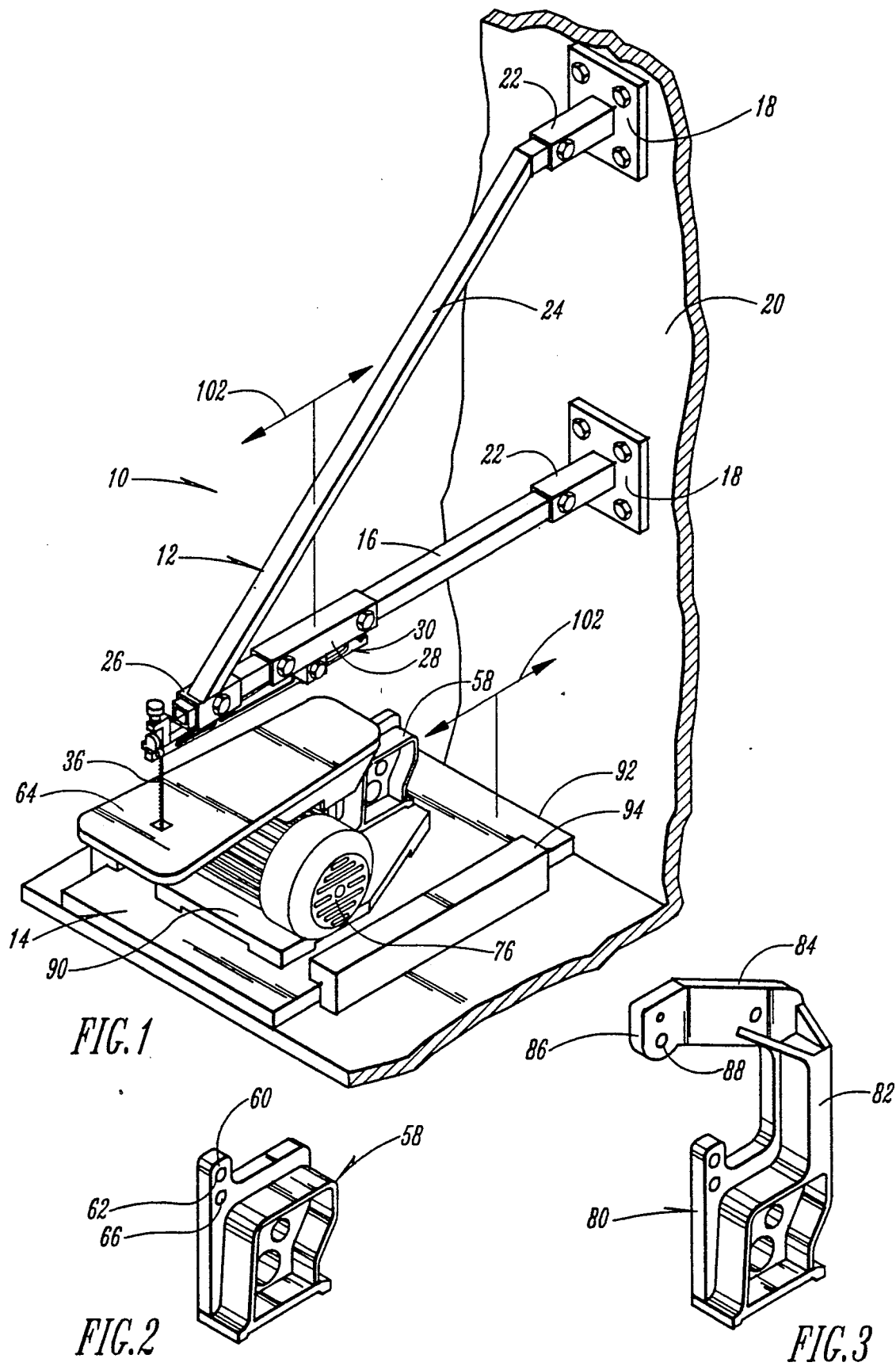
FIG. 1 is a fragmentary perspective view of the scroll saw of this invention having a wall mounted support arm for the upper saw blade arm.
FIG. 2 is a perspective view of the rear support for the table and lower blade arm.
FIG. 3 is a perspective view of the rear one piece support for the table and upper and lower blade arms in a conventional scroll saw.

The scroll saw of this invention is referred to generally in FIG. 1 by the reference numeral 10 and includes an upper saw unit 12 and a lower saw unit 14.

The upper saw unit 12 includes a wall support arm 16 connected by a bracket 18 to the wall 20 through a sleeve 22. A brace arm 24 extending from the wall 20 connects through a sleeve 26 to the outer end of the support arm 16. A slidable guide sleeve 28 is carried on the wall support arm 16 and includes a pivotal upper blade arm 30 which pivots on a pin 32.

Figures 6, 7, 8:
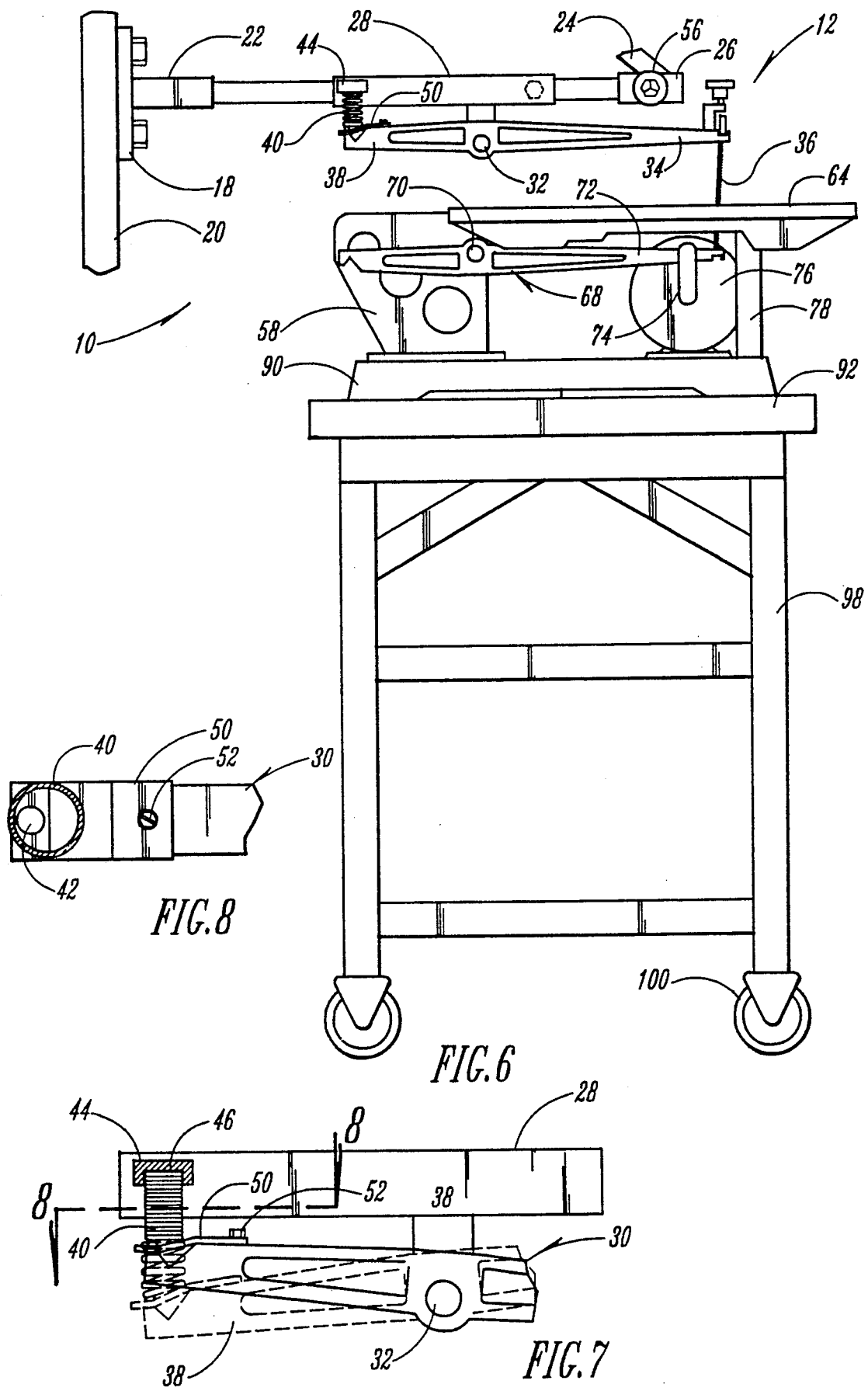
FIG. 6 is a side elevational view similar to FIG. 4 but showing the lower saw unit mounted on a moveable cart.
FIG. 7 is an enlarged fragmentary view of the coil spring connection between the wall support arm and the upper blade arm as indicated by line 7—7 in FIG. 4.
FIG. 8 is a cross sectional view taken along line 8—8 in FIG. 7.

The upper blade arm 30 has a forward end 34 to which a blade 36 is connected. The opposite rear end 38 of the upper blade arm 30 is biased downwardly by a coil spring 40 mounted on a pin 42. The coil spring 40 extends into a spring cap 44 having a recess 46 as seen in FIG. 7. The spring cap 44 is mounted on the guide sleeve 28. The pin 42 is carried on a plate 50 connected to the top of the upper blade arm 30 by a screw 52 as seen in FIGS. 7 and 8.

Figure 4:
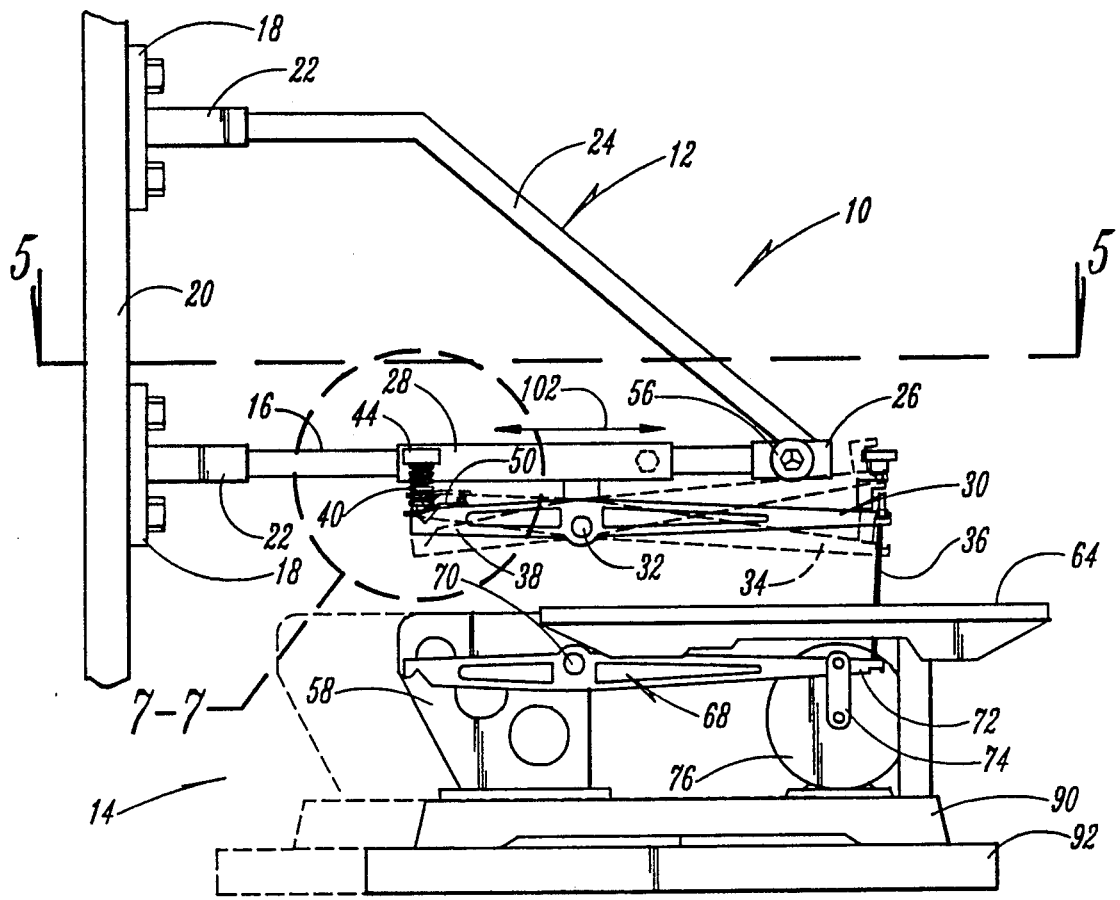
FIG. 4 is a side elevational view of the scroll saw of this invention as seen in FIG. 1.
Figure 5:
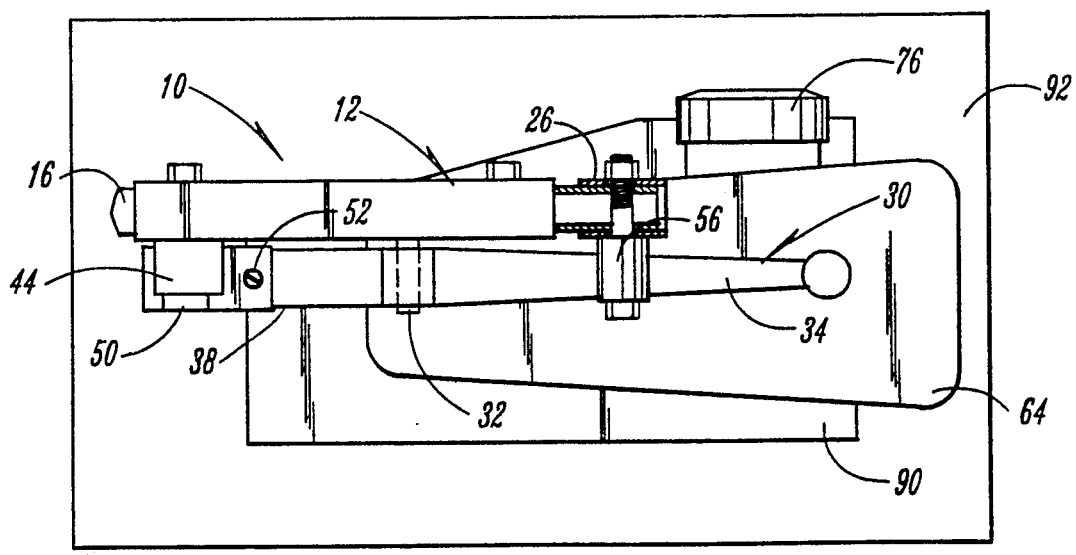
FIG. 5 is a cross sectional view taken along line 5—5 in FIG. 4.

As seen in FIGS. 4 and 6, a cushioned bumper stop 56 is mounted on the sleeve 26 in the plane of the upper blade arm 30 to limit upper travel of the forward end 34 should the blade 36 break.

The lower saw unit 14 includes a lower blade arm and table support 58 as seen in FIGS. 1, 2 and 6. An ear 60 includes an aperture 62 for a pin connecting a table 64 and an aperture 66 for pivotally connecting a lower blade arm 68. The lower blade arm 68 pivots on a pin 70 received in the aperture 66 as seen in FIG. 6.

The lower blade arm 68 has a forward end 72 connected to the blade 36 and to an eccentric 74 in turn connected to a motor 76. The forward end of the table 64 is supported by a support member 78.

Thus it is seen in operation that the motor 76 will cause the eccentric 74 to reciprocate up and down forward end 72 of the lower blade arm 68 thereby pivoting the upper blade arm 30 against the action of the coil spring 40. The upper and lower blade arms 30 and 68 respectively are spaced apart and totally independent such that there is no interference to a work piece being moved on the table 64 to be cut by the blade 36. The length of the work piece is limited only by the length of the wall support arm 16 which determines how far the blade 36 is spaced from the wall 20.

It is particularly noted that should the blade 36 break, the forward end 34 of the upper blade arm 30 will simply pivot upwardly into engagement with the cushion stop member 56 and no damage will be done to the arm 30. Additionally, a new blade can be installed and sawing immediately resumed without any adjustments being required. The coil spring 40 is at rest when fully expanded as seen in FIGS. 4 and 7 when the rear end 38 is in its lower most position and the forward end is in its uppermost position. Downward travel of the forward end 34 causes the coil spring 40 to be compressed and keeps the blade 36 tight at all times.

The conventional scroll saw includes not only a spring, not shown, interconnecting the rear ends of the upper and lower blade arms 30 and 68 but additionally the rear frame support 80 for the table 64 and upper blade arm as seen in FIG. 3. The lower half of the support is identical to that of FIG. 2 but additionally includes an upstanding portion 82 having a forwardly extending upper arm support 84 with an ear 86 having an aperture 88 to receive a pin on which the upper blade arm 30 is pivotally mounted. The scroll saw of this invention is made possible by cutting off the upstanding portion 82 with the upper arm support 84 or by simply fabricating a new support 58 as seen in FIG. 2. The latter approach saves the original frame component 80 when retrofitting an existing scroll saw such that later conventional saw operation can be had if desired.

The lower saw unit 14 is mounted on a base 90 which in turn is mounted on a movable platform 92 as seen in FIG. 1. L-shaped hold-down guides 94 are provided on opposite sides of the platform 92 allowing the platform to be slid to any desired position away from the wall 20 as the upper saw unit 12 moves on the wall support arm 16 through the sleeve 28. In FIG. 6 the base 90 is mounted on a cart 98 having wheels 100 allowing for convenient movement towards and away from the wall 20 as indicated by the directional arrows 102 in FIG. 1.

What is claimed is:

1. A scroll saw comprising,
    pivotal upper and lower blade arms,
    a blade interconnecting said upper and lower blade arms,
    a power means connected to said lower arm for pivoting said lower arm and reciprocating said blade,
    spring means connected to said upper blade arm for biasing it to maintain said blade taut,
    said upper and lower blade arms being spaced apart, independently supported and interconnected only by said blade whereby work pieces of any desired length may be cut, and
    a cushioned stop being positioned in the plane of said upper blade arm to limit its upward travel at its forward end upon the blade breaking.

2. The structure of claim 1 wherein said upper blade arm is supported by a room wall and said lower blade arm is floor supported.

3. The structure of claim 1 and a support arm extends from a wall and said upper blade arm is pivotally supported thereby.

4. The structure of claim 3 wherein upper blade arm is slidably mounted on said support arm to accommodate work pieces of varying lengths.

5. The structure of claim 4 and said lower blade arm is operatively mounted on a moveable platform whereby said upper and lower blade arms can be moved to positions for maintaining said blade vertically aligned between said blade arms.

6. The structure of claim 1 and said upper blade arm is pivotally mounted intermediate its ends to a support arm, and said spring means extends from said support arm and engages said upper blade arm at its end opposite said blade for biasing said blade end upwardly.

7. The structure of claim 6 and said spring is a coil spring normally extended with said power means compressing said spring when reciprocating said blade.

8. a scroll saw comprising,
    pivotal upper and lower blade arms,
    a blade interconnecting said upper and lower blade arms,
    a power means connected to said lower arm for pivoting said lower arm and reciprocating said blade,
    spring means connected to said upper blade arm for biasing it to maintain said blade taut,
    said upper and lower blade arms being spaced apart, independently supported and interconnected only by said blade whereby work pieces of any desired length may be cut, and
    said upper blade arm being slidably mounted on a support arm to accommodate work pieces of varying lengths, and said lower blade arm being operatively mounted on a moveable platform whereby said upper and lower blade arms can be moved to positions for maintaining said blade vertically aligned between said blade arms.

9. The structure of claim 8 and said upper blade arm is pivotally mounted intermediate its ends to a support arm, and said spring means extends from said support arm and engages said upper blade arm at its end opposite said blade for biasing said blade end upwardly.

10. The structure of claim 9 and said spring is a coil spring normally extended with said power means compressing said spring when reciprocating said blade.

11. The structure of claim 8 and a cushioned stop is positioned in the plane of said upper blade arm to limit its upward travel at its forward end upon the blade breaking.

* * * * *